(12) United States Patent
Becker

(10) Patent No.: US 8,348,112 B2
(45) Date of Patent: Jan. 8, 2013

(54) MOUNTING SYSTEM FOR MOUNTING AN ELECTRONIC DEVICE ON A VEHICLE

(75) Inventor: Derrick J. Becker, Ankeny, IA (US)

(73) Assignee: Deere & Company, Moline, IL (US)

( * ) Notice: Subject to any disclaimer, the term of this patent is extended or adjusted under 35 U.S.C. 154(b) by 810 days.

(21) Appl. No.: 12/182,406

(22) Filed: Jul. 30, 2008

(65) Prior Publication Data

US 2010/0025561 A1 Feb. 4, 2010

(51) Int. Cl.
*A47B 96/06* (2006.01)
*F16M 13/00* (2006.01)

(52) U.S. Cl. ........................................ 224/547; 224/929

(58) Field of Classification Search .................. 224/545, 224/547, 553, 555, 556, 558, 560, 929, 319, 224/324, 330, 42.32, 42.4, 422, 429, 430, 224/452, 45; D12/107, 407, 412; 248/222.11, 248/222.12, 222.13, 200; 379/454; 454/575.1
See application file for complete search history.

(56) References Cited

U.S. PATENT DOCUMENTS

| | | | |
|---|---|---|---|
| 4,473,251 A * | 9/1984 | Murayama | 296/78.1 |
| 4,630,160 A | 12/1986 | Murayama | |
| 4,931,907 A | 6/1990 | Robinson et al. | |
| 5,826,922 A | 10/1998 | Wernig | |
| 6,142,349 A * | 11/2000 | Roberson | 224/401 |
| 6,845,894 B1 * | 1/2005 | Vyvoda | 224/405 |
| 6,918,521 B2 * | 7/2005 | Settelmayer et al. | 224/319 |
| 7,296,830 B2 | 11/2007 | Koveal et al. | |
| 2002/0196123 A1 | 12/2002 | Diehl et al. | |
| 2004/0108429 A1 * | 6/2004 | Field et al. | 248/311.2 |
| 2005/0067840 A1 * | 3/2005 | Koveal et al. | 292/95 |
| 2005/0107046 A1 | 5/2005 | Desbarats et al. | |
| 2005/0146860 A1 | 7/2005 | Chen et al. | |
| 2008/0149675 A1 * | 6/2008 | Moreau et al. | 224/320 |

FOREIGN PATENT DOCUMENTS

| | | |
|---|---|---|
| EP | 0138022 A2 | 4/1985 |
| WO | 2007101787 A2 | 9/2007 |

OTHER PUBLICATIONS

European Search Report dated Apr. 5, 2012 (7 pages).

* cited by examiner

*Primary Examiner* — Justin Larson
*Assistant Examiner* — Adam Waggenspack

(57) ABSTRACT

A mounting system for mounting an electronic device on a vehicle is disclosed herein. The mounting system includes a mounting bracket that can be attached to a vehicle. The mounting bracket has a first member defining an engaging member and a second member defining a keeper. The mounting system also includes a retainer attached to the electronic device and capable of engaging and rotating around the engaging member. Additionally, the mounting system includes a latch associated with the electronic device. The latch comprises a rotor capable of engaging the keeper and securing the electronic device to the mounting bracket after the retainer has engaged the engaging member.

24 Claims, 5 Drawing Sheets

MOUNTING SYSTEM FOR MOUNTING AN ELECTRONIC DEVICE ON A VEHICLE

FIELD OF THE INVENTION

This invention relates to a mounting system for mounting an electronic device on a vehicle.

BACKGROUND OF THE INVENTION

Location-determining receivers, sensors and other electronic devices are commonly mounted on agricultural vehicles to provide ground position information to a variety of precision agriculture applications. One current approach to mounting location-determining receivers (e.g., global positioning system (GPS) receivers) and other electronic devices on vehicles places the device in a cantilevered position protruding from the roof of the vehicle. Cantilever mounting imposes weight limits for the device. In addition, certain cantilevered devices are susceptible to high levels of shock, vibration or other displacement or movement, which can have adverse effects on the accuracy of position information provided by the location-determining receiver. Another disadvantage to current cantilever mounting systems is presented by the installation process for securing a device to a vehicle that generally requires two hands. Therefore, there is a need for an improved mounting system for mounting an electronic device on a vehicle that is capable of reducing shock and vibration.

SUMMARY OF THE INVENTION

A mounting system for mounting an electronic device on a vehicle is disclosed. The mounting system includes a mounting bracket that can be attached to a vehicle. The mounting bracket has a first member defining an engaging member and a second member defining a keeper. The mounting system also includes a retainer attached to the electronic device and capable of engaging and rotating around the engaging member. Additionally, the mounting system includes a latch associated with the electronic device. The latch comprises a rotor capable of engaging the keeper and securing the electronic device to the mounting bracket during or after the retainer has engaged the engaging member.

DESCRIPTION OF THE PREFERRED EMBODIMENT

Figure 1:
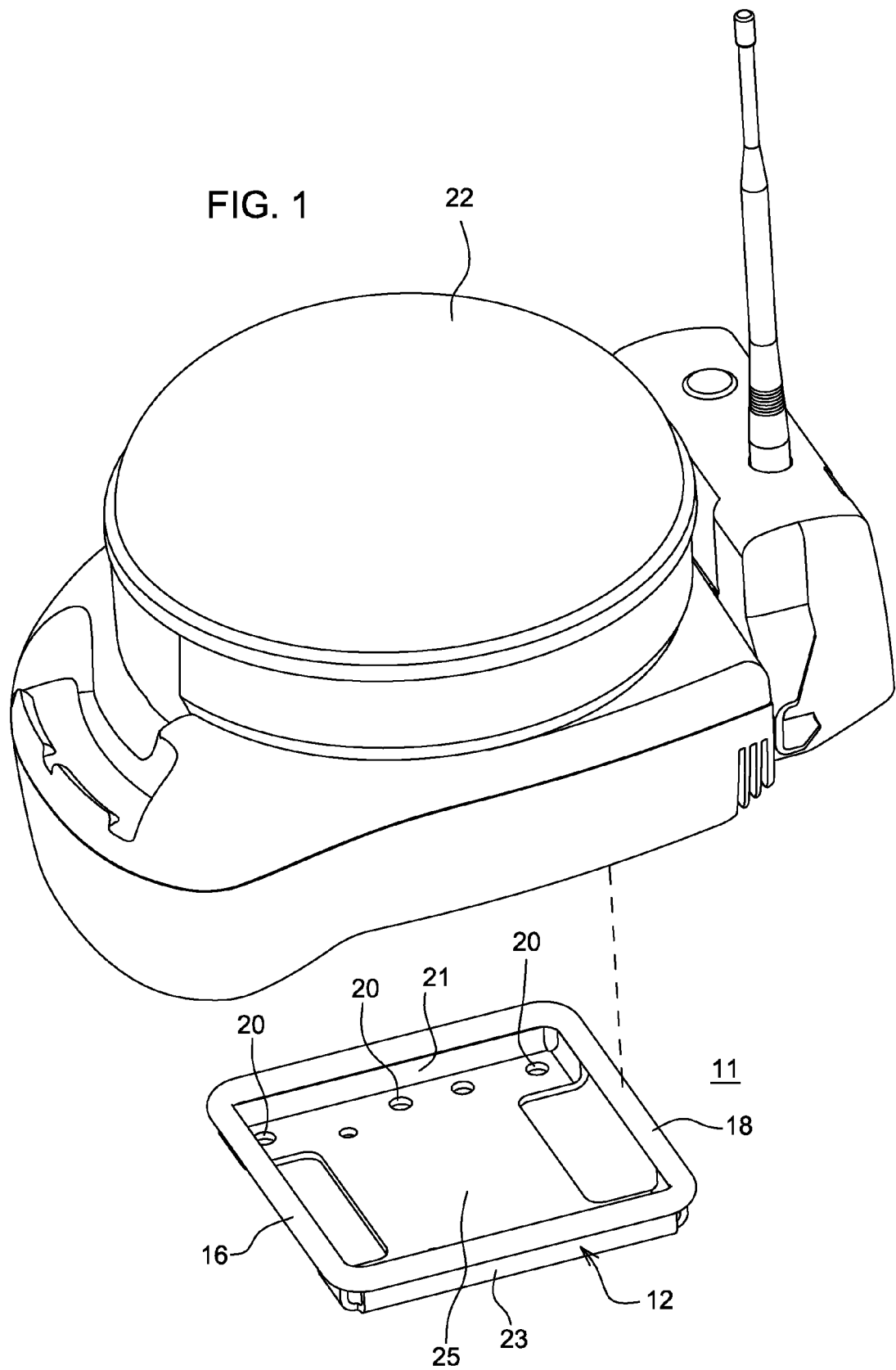
FIG. 1 is an exploded view of one embodiment of a removable device and a bracket for attaching the removable device to a vehicle.

Referring to FIG. 1, a mounting system 11 is shown for securely mounting a removable device 22 (e.g., an electronic device or location-determining receiver) to a vehicle using a mounting bracket 12 securely attached to a vehicle (not shown).

Figure 2:
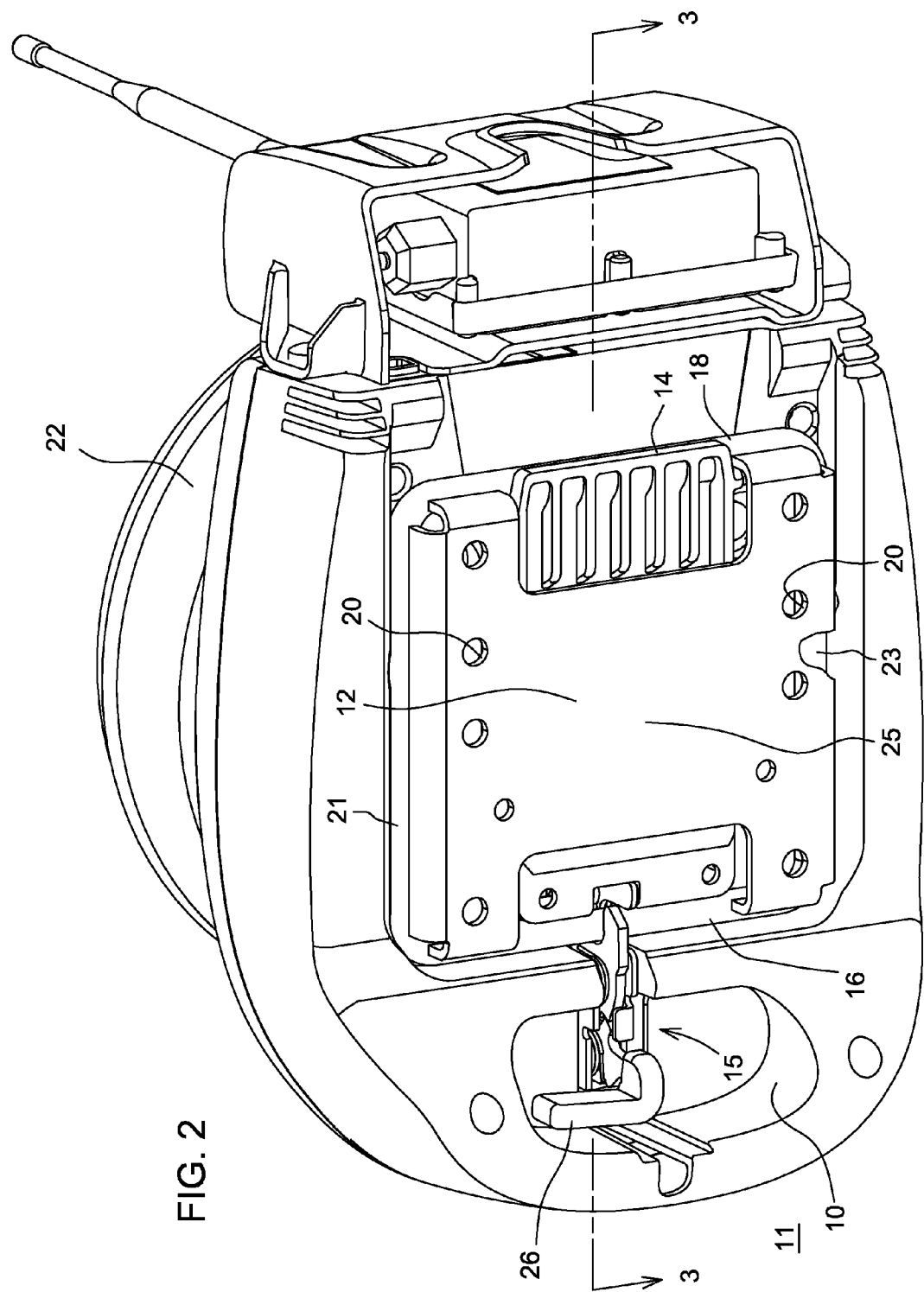
FIG. 2 shows a perspective view of one embodiment of a bottom of the removable device coupled to a bracket for attaching the removable device to the vehicle.
Figure 3:
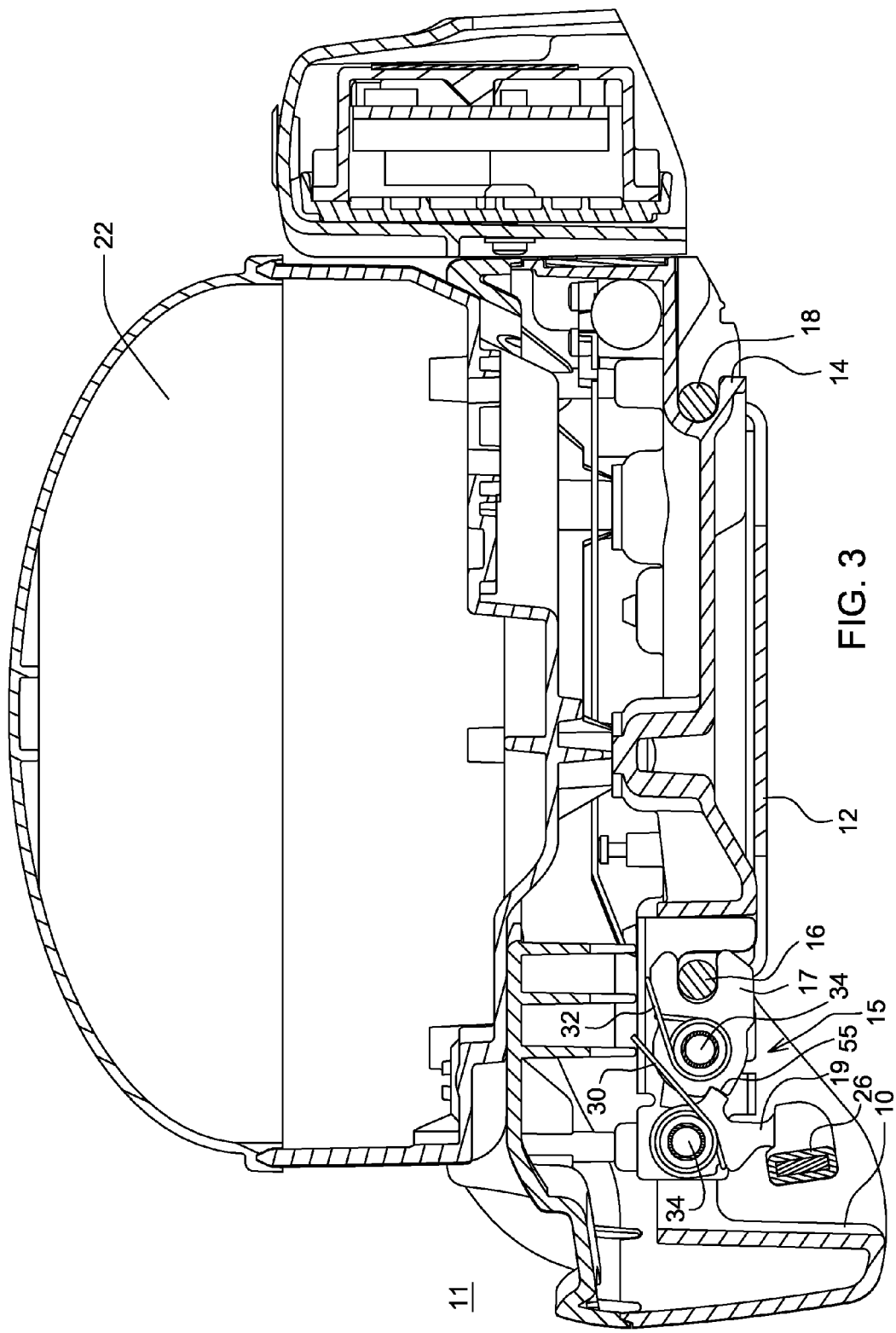
FIG. 3 is a cross-section side view of the removable device coupled to a bracket for attaching the removable device to a vehicle.

Referring to FIG. 2 and FIG. 3, the removable device 22 is associated with a retainer 14 and a latch 15. The mounting bracket 12 comprises an engaging member 18 and a keeper 16. The retainer 14 is capable of receiving or engaging the engaging member 18. During assembly of the removable device 22 and the mounting bracket 12 in a first state (e.g., in an open state), the retainer 14 and the engaging member 18 form a hinge or define a rotational axis about which the retainer 14 and the removable device 22 can rotate. The rotation of the retainer 14 about the engaging member 18 allows the removable device 22 to be positioned (or rotated) such that the latch 15 engages the keeper 16. Once the retainer 14 has engaged the engaging member 18 and the latch 15 engages the keeper 16, rotation of the removable device 22 is prevented in a second state (e.g., a closed or locked state). Closing of the latch 15 about the keeper 16 secures the removable device 22 to the mounting bracket 12 until the latch 15 is released by triggering an accessible release 26.

The removable device 22 is any device that may be removably mounted to a vehicle. In one embodiment, the removable device 22 is a location-determining receiver or a global positioning system (GPS) receiver. The removable device 22 may be another type of electronic device or a sensor in alternative embodiments.

The vehicle is anticipated to be a tractor, combine, or other agricultural vehicle. Alternatively, vehicle may refer to an agricultural implement, construction vehicle, forestry vehicle, mining equipment, truck, military vehicle, train, aircraft, ship, vessel, watercraft or other vehicle that may require installation of an electronic device. The vehicle may be another type of vehicle in alternative embodiments.

Mounting Bracket

In FIG. 1 and FIG. 3, inclusive, the mounting bracket 12 comprises an engaging member 18 and a keeper 16. As shown, the engaging member 18 is generally parallel to the keeper 16, although in an alternative embodiment the engaging member 18 or the keeper 16 may be curved; hence, the engaging member 18 and the keeper 16 may exist in a non-parallel configuration. The engaging member 18 and keeper 16 are generally cylindrical or each has an interface or portion with a generally cylindrical cross section. The engaging member 18 and the keeper 16 may be connected by a first side 21 that is generally perpendicular to the engaging member 18 and the keeper 16. Likewise, the engaging member 18 and the keeper 16 may be connected by a second side 23 that is generally perpendicular to the engaging member 18 and the keeper 16. As shown, the first side 21 and the second side 23 are generally parallel to each other, although in an alternative embodiment the first side 21 and the second side 23 may be curved; hence, the first side 21 and the second side 23 may exist in a non-parallel configuration.

In one embodiment, a flange 25 is included in at least part of the spatial area bounded by the engaging member 18, keeper 16, first side 21, and second side 23. In one embodiment, the flange 25 includes mounting holes 20 for attaching the mounting bracket 12 to the vehicle. The mounting bracket 12 may be composed of plastic, metal, alloy, polymer, composite material, fiber-reinforced plastic, fiber-reinforced polymer or any other suitable material.

In one embodiment, mounting bracket 12 is symmetrical such that the engaging member 18 and the keeper 16 have substantially similar cross sectional dimensions or configurations. For example, the engaging member 18 and keeper 16 may be generally uniform in size and shape. Such symmetry allows the mounting bracket 12, whose keeper 16 may potentially experience wear with prolonged use, to be removed from the vehicle, rotated 180 degrees, and reattached to the vehicle. Once the mounting bracket 12 has been rotated and reattached, the engaging member 18 performs the role of keeper 16, and the keeper 16 performs the role of the engaging member 18.

Retainer

In one embodiment, the retainer 14 is an integral part of the structure of the removable device 22. In this embodiment, the retainer 14 comprises a molded tab extending from the removable device 22, and a recess is formed between the retainer 14 and a surface (e.g. outer surface) of the removable device 22. Installation of the removable device 22 on the vehicle may involve inserting the retainer 14 under or partially around the engaging member 18. The combination of the retainer 14 and the engaging member 18 forms a hinge or rotational axis in which the retainer 14 at least partially encircles the engaging member 18. The engaging member 18 forms a rotational axis about which the retainer 14 and the removable device 22 can rotate. Rotation of the retainer 14 about the engaging member 18 allows the latch 15 to engage the keeper 16.

In another embodiment, the retainer 14 comprises a bracket that is separate from the removable device 22. The bracket is secured to the removable device 22 by fasteners, adhesives, connectors, or otherwise. Use of a separate bracket allows an existing removable device 22 to be adapted to use the mounting system 11. As in the embodiment in which the retainer 14 is an integral part of the structure of the removable device 22, a recess is formed between the retainer 14 and a surface of the removable device 22. Installation of the removable device 22 on the vehicle may involve inserting the retainer 14 under or partially around the engaging member 18. The combination of the retainer 14 and the engaging member 18 forms a hinge or rotational axis in which the retainer 14 at least partially encircles the engaging member 18. The engaging member 18 forms a rotational axis about which the retainer 14 and the removable device 22 can rotate. Rotation of the retainer 14 about the engaging member 18 allows the latch 15 to engage the keeper 16.

In one embodiment, the retainer 14 may comprise an uninterrupted tab whose length is approximately equal to the length of the engaging member 18. Further, the retainer 14 is of sufficient length to prevent lateral torsional movement of the removable device 22 once the retainer 14 has engaged the engaging member 18 and the latch 15 has engaged the keeper 16.

In another embodiment, retainer 14 has a length that is less than the length of the engaging member 18. In this embodiment, the length of the retainer 14 is sufficient to prevent lateral torsional movement of the removable device 22 once the retainer 14 has engaged the engaging member 18 and the latch 15 has engaged the keeper 16. For example, a retainer 14 whose length is at least half of the length of the engaging member 18 is sufficient to prevent lateral torsional movement of the removable device 22.

Latch

In one embodiment, as illustrated in FIG. 3, the latch 15 is a standard rotary latch which comprises a rotor 17, rotor spring 32, pawl 19, pawl spring 30, and release lever 26. The rotor 17 and rotor spring 32 are pivotally mounted to the removable device 22 about a shaft 34 associated with the removable device 22. The pawl 19 and pawl spring 30 are similarly pivotally mounted to the removable device 22 about a shaft 34 associated with the removable device 22. The rotor 17 is spring loaded by rotor spring 32 toward an open position. When the rotor 17 engages the keeper 16, the rotor 17 rotates to partially encircle the keeper 16. The pawl 19 also engages the rotor 17, holding the rotor 17 in a closed position. The pawl 19 is spring loaded by pawl spring 30 toward a direction that presses the pawl 19 against a notch 55 in the rotor 17, holding the rotor 17 in the closed position. A release lever 26 is attached to the pawl 19. To release the pawl 19, the biasing force of the pawl spring 30 and the rotor spring 32 must be overcome by application of force by a user.

In another embodiment, a manual latch is used.

As shown, a single latch 15 engages the keeper 16, securing the removable device 22 to the mounting bracket 12. Alternatively, two or more latches 15 may be used, with each latch 15 engaging the keeper 16. Use of two or more latches 15 provides additional stability for the removable device 22, and provides redundancy to ensure that the removable device 22 remains securely attached to the mounting bracket 12.

To allow removal of the removable device 22, the release 26 must be accessible to an operator. In one embodiment, the release 26 is situated inside an indentation 10. In addition to providing access to the release 26, such an indentation defines a handle that provides for a placement of the operator's hand that is convenient for the purposes of carrying, installing, and removing the removable device 22.

To protect the removable device 22 from vibration or shock, the mounting system 11 may further comprise one or more isolators. An isolator may be rubber, elastomer, or any other suitable resilient material.

In one embodiment, the isolator comprises one or more resilient barbs, one end of which is inserted into a hole or other opening in a surface of the removable device 22 between the removable device 22 and the mounting bracket 12. In another embodiment, the isolator comprises one or more resilient disks that are fastened (e.g., attached using screws or adhesive) to the removable device 22 between the removable device 22 and the mounting bracket 12. In another embodiment, the isolator comprises a resilient sheet that is inserted between the removable device 22 and the mounting bracket 12 during assembly.

In one embodiment, the isolator contacts the removable device 22 prior to the rotor 17 of the latch 15 engaging the keeper 16, and the isolator is capable of being compressed during installation to allow the rotor 17 to engage the keeper 16. The isolator is capable of expanding to prevent vibration or other movement of the removable device 22 during operation of the vehicle.

In another embodiment, an isolator (e.g., resilient isolator) is inserted between the mounting bracket 12 and the vehicle to reduce shock and vibration transmitted to the device 22 during movement of the vehicle.

Figure 4:
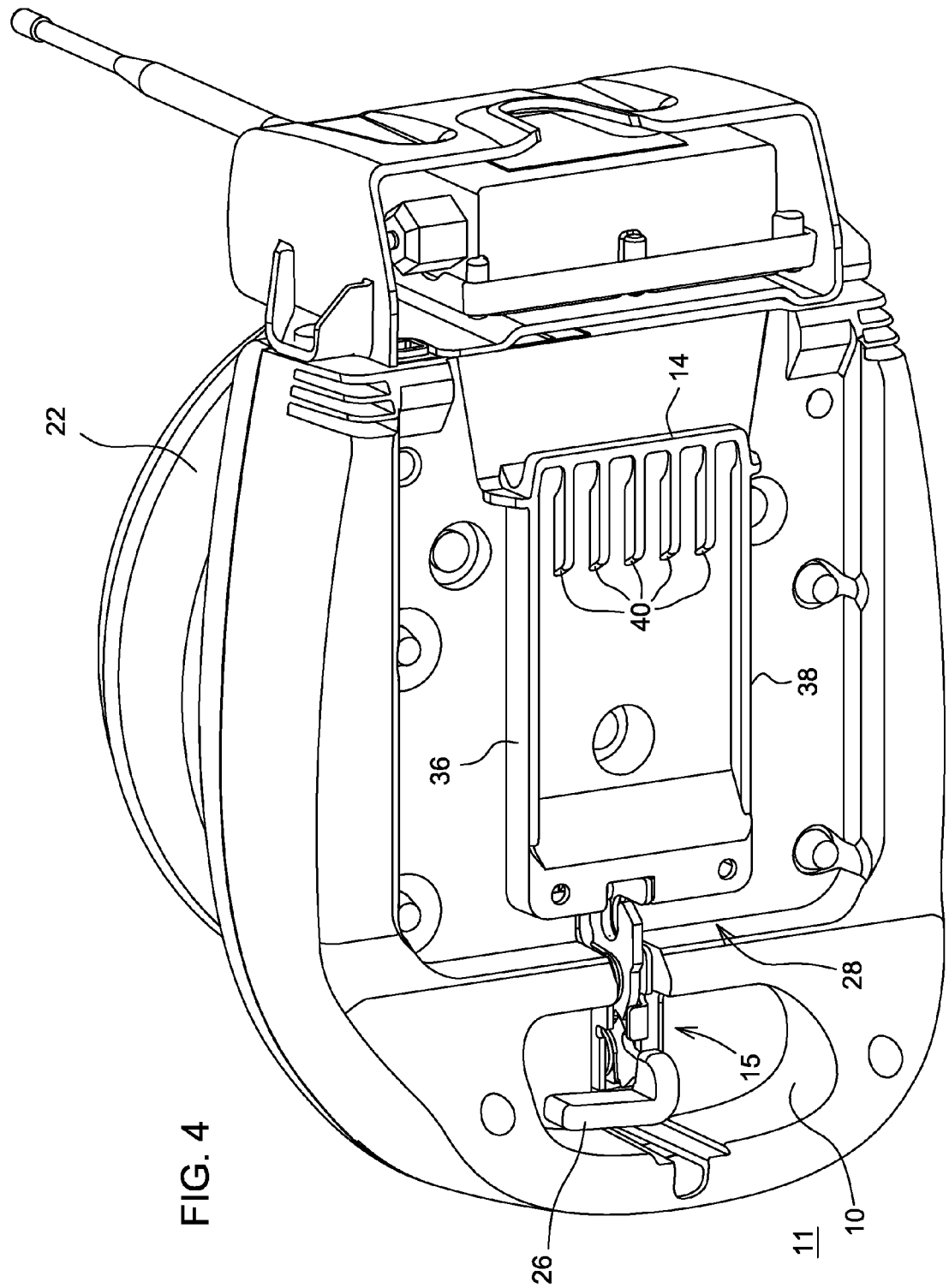
FIG. 4 shows a perspective view of one embodiment of a bottom of the removable device.

In one embodiment, as shown in FIG. 4, removable device 22 is associated with a protrusion 28 that mates with a recess defined by the engaging member 18, keeper 16, and first side 21 and second side 23 of mounting bracket 12. The protrusion 28 comprises at least a first wall 36 and a second wall 38. In one embodiment, the protrusion may further comprise one or more pads, ribs or strips 40 that lie between or interconnect the first wall 36 and the second wall 38. The protrusion 28 has a perimeter that is slightly smaller than the perimeter of the recess defined by the engaging member 18, keeper 16, and first side 21 and second side 23 of mounting bracket 12 such that the protrusion 28 fits securely in the recess defined by the engaging member 18, keeper 16, and first side 21 and second side 23 of mounting bracket 12, and lateral torsional movement of the removable device 22 is prevented. As shown, the protrusion 28 is generally rectangular, although the protrusion 28 may be another shape that fits securely in the recess defined by the engaging member 18, keeper 16, and first side 21 and second side 23 of mounting bracket 12, hence preventing lateral torsional movement of the removable device 22.

In another embodiment, the first wall 36 and second wall 38 of protrusion 28 taper inwardly as the walls (36, 38) extend from the removable device 22. The tapered shape of the protrusion 28 aligns the protrusion 28 inside the recess defined by the engaging member 18, keeper 16, and first side 21 and second side 23 of mounting bracket 12, and lateral torsional movement of the removable device 22 is prevented.

In yet another embodiment, the protrusion 28 may comprise a generally polyhedral structure having the first wall 36 and the second wall 38 integrated into the polyhedral structure.

Assembly

To attach the removable device 22 to the vehicle, the mounting bracket 12 is attached to the vehicle. The mounting bracket 12 is attached to the vehicle using screws, rivets, bolts, adhesive, or other attachment means. Once the mounting bracket 12 is attached to the vehicle, the removable device 22 can be installed on the vehicle and removed repeatedly without removing or reinstalling the mounting bracket 12.

During assembly, the latch 15 is in a first position (e.g. an open state). The isolator is in a first state (e.g., an uncompressed or expanded state). The retainer 14 is inserted into the engaging member 18, forming a hinge or rotational axis about which the retainer 14 and the removable device 22 can rotate. The removable device 22 is rotated about the engaging member 18. As the removable device 22 is rotated about the engaging member 18, the rotor 17 of the latch 15 approaches the keeper 16. The isolator (if present) may exert pressure on the removable device 22 prior to engagement of the latch 15 to the keeper 16, and pressure may be applied by a user to compress the isolator (if present) and to allow the latch 15 to engage the keeper 16. When the latch 15 engages the keeper 16, the latch 15 rotates into a second position (e.g. a closed or locked state) and closes around the keeper 16. The release lever 26 holds the pawl 19 in a position such that the rotor 17 is held in the closed position encircling the keeper 16. The pawl 19 is held in such position and the removable device 22 thus remains securely fastened to the vehicle as long as the release 26 is not triggered. Once the latch 15 has engaged the keeper 16, the isolator may expand, exerting pressure on the removable device 22, and preventing vibration or other movement of the removable device 22. When the latch 15 is in the closed or locked state, the removable device 22 is securely attached to the vehicle. Rotation of the retainer 14 and the removable device 22 about the engaging member 18 is prevented.

During disassembly, the release 26 is triggered by a user. Triggering of the release 26 allows the pawl 19 to rotate, thus allowing the rotor 17 to rotate into the open position and allowing the removable device 22 to be removed from the mounting bracket by removing the retainer 14 from the engaging member 18.

Accordingly, the mounting system 12 facilitates securely, but removably, attaching an electronic device to a vehicle using simple, one-handed installation and removal of the device without the use of tools or small hardware pieces. The mounting system 11 requires no magnet (for mounting) which could interfere with sensitive electronic equipment and which would require a ferrous structure on the vehicle. The mounting system 11 may be used advantageously in conjunction with metal alloy, plastic, polymeric or composite body panels or portions of a vehicle. A removable device 22 installed using the mounting system 11 may be removed from the vehicle with one hand and without the use of tools or separate hardware. Once the mounting bracket 12 is installed, the mounting system 11 enables consistent placement of the removable device 22 each time the removable device 22 is installed on the vehicle, which enables consistent location information to be provided to precision farming software for every installation when the removable device 22 is a location-determining receiver.

Figure 5:
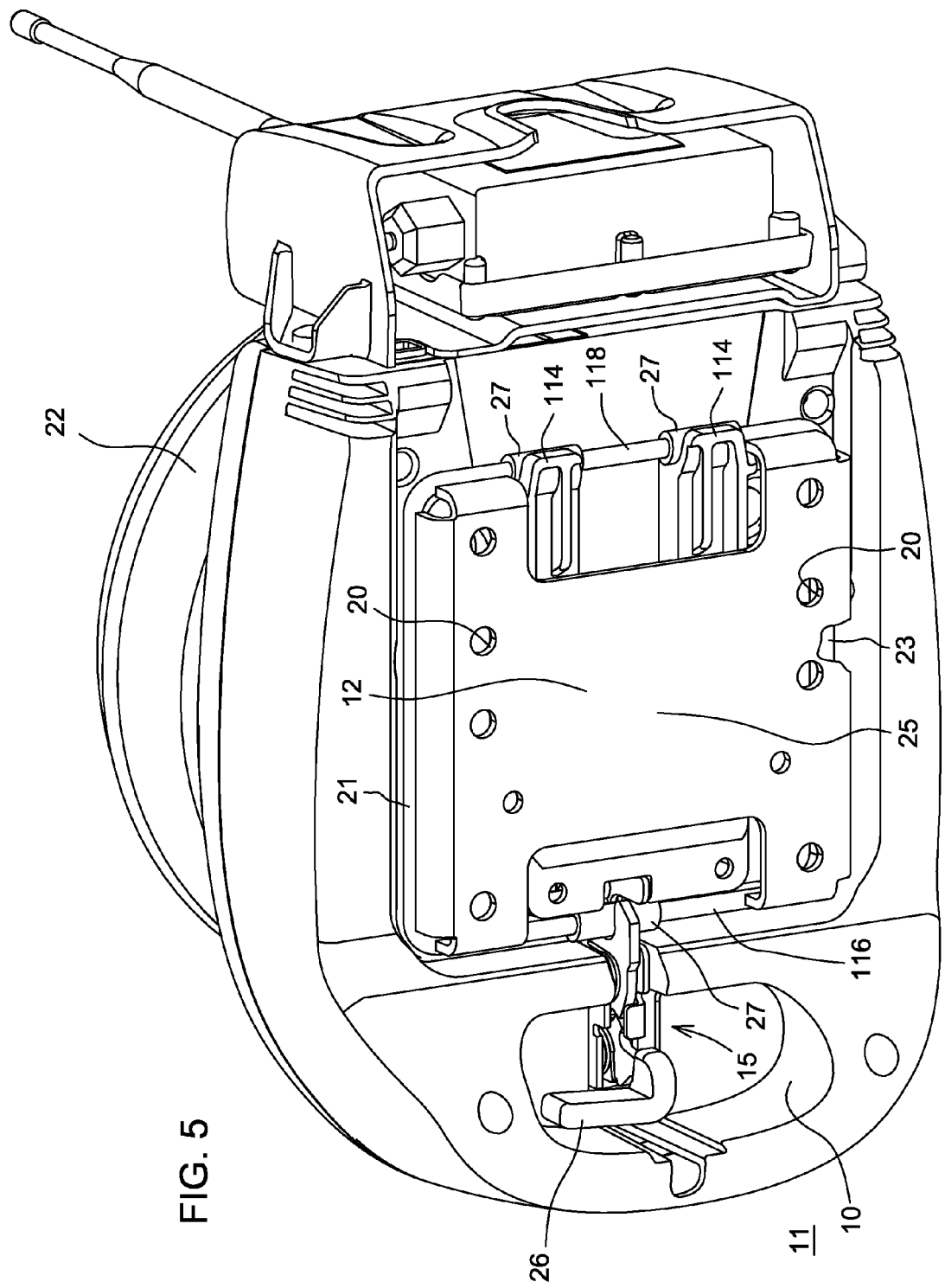
FIG. 5 shows an alternative embodiment of a bottom of a removable device coupled to a bracket for attaching the removable device to the vehicle.

Referring to FIG. 5, in another embodiment, the retainer 114 comprises two or more discrete hinge members rather than one continuous tab. The discrete hinge members comprise tabs that are separated by sufficient space to prevent lateral torsional movement of the removable device 22 once the retainer 114 has engaged the engaging member 118 and the latch 15 has engaged the keeper 116. For example, placing the discrete hinge members such that the length defined by the outer ends of the hinge members is approximately equal to or greater than approximately one-half of the length of the engaging member 118 is sufficient to prevent lateral torsional movement of the removable device 22. The embodiment of FIG. 5 differs from the embodiment shown in FIG. 2 because the retainer 114 shown in FIG. 5 comprises discrete hinge members rather than comprising a continuous tab as shown by retainer 14 in FIG. 2.

Further, the keeper 116 and the engaging member 118 may each comprise one or more interface members 27 (e.g., radial bushings) that are generally cylindrical and are associated (e.g., secured or rotationally connected) with the keeper 116 and the engaging member 118. The embodiment of FIG. 5 differs from the embodiment shown in FIG. 2 because the engaging member 118 and the keeper 116 shown in FIG. 5 comprise one or more engaging members 27 rather than comprising uniform, generally cylindrical members as shown by engaging member 18 and keeper 16 in FIG. 2. The interface members 27 are optional and may be deleted from certain embodiments. The assembly process for the embodiment of FIG. 5 is identical to the assembly process for the embodiment shown in FIG. 2.

Having described one or more preferred embodiments, it will become apparent that various modifications can be made without departing from the scope of the invention as defined in the accompanying claims.

The following is claimed:

1. A mounting system comprising:
  a mounting bracket, said mounting bracket having an engaging member and a keeper, said engaging member and said keeper each being generally cylindrical, said mounting bracket attachable to a vehicle via a flange of the mounting bracket, the flange bounded by the engaging member and the keeper;
  a plurality of sides extending upward from the flange to support the engaging member and the keeper above the flange;
  a retainer attached to, or integral with, a removable electronic device, said retainer capable of engaging and rotating around said engaging member that is fixed to form a hinge; and
  a latch connected to said removable electronic device, said latch comprising a spring-loaded rotor capable of engaging said keeper and securing said removable electronic device to said mounting bracket after said retainer has engaged said engaging member to rotate about the hinge.

2. The mounting system of claim 1 wherein said retainer has a retainer length, said engaging member has a length, and said retainer length of said retainer is generally equal to said length of said engaging member.

3. The mounting system of claim 1 wherein said retainer comprises two or more hinge members, spaced apart from each other, for engaging the engaging member.

4. The mounting system of claim 1 wherein said engaging member comprises one or more interface members for engaging said retainer, and said keeper comprises one or more interface members for engaging said latch.

5. The mounting system of claim 1 wherein said engaging member and said keeper are connected by a first side and a second side.

6. The mounting system of claim 5 further comprising a protrusion associated with said removable device and mating with a recess defined by said engaging member, said keeper, said first side and said second side.

7. The mounting system of claim 1 wherein said mounting bracket is symmetrical such that said engaging member and said keeper are generally uniform in size and shape such that said mounting bracket may be rotated 180 degrees to attach the removable device to said vehicle.

8. The mounting system of claim 1 wherein said latch further comprises a pawl pivotally connected to said removable device and engaging said rotor to hold said rotor in a closed position.

9. The mounting system of claim 8 wherein said rotor is spring loaded toward an open position.

10. The mounting system of claim 9 further comprising a release connected to said pawl wherein triggering of said release allows said pawl to rotate, thereby allowing said rotor to rotate into said open position.

11. A mounting system comprising:
a mounting bracket, said mounting bracket having an engaging member and a keeper, said engaging member and said keeper are joined together or coupled by a first side and by a second side, said engaging member and said keeper each being generally cylindrical, said mounting bracket attachable to a vehicle via a flange of the mounting bracket, the flange bounded by the engaging member and the keeper;
a plurality of sides extending upward from the flange to support the engaging member and the keeper above the flange;
a retainer attached to, or integral with, a removable electronic device, said retainer capable of engaging and rotating around said engaging member that is fixed to form a hinge;
a latch connected to said removable electronic device, said latch comprising a spring-loaded rotor capable of engaging said keeper and securing said removable electronic device to said mounting bracket after said retainer has engaged said engaging member to rotate about the hinge; and
a protrusion associated with said removable device and mating with a recess defined by said engaging member, said keeper, said first side and said second side.

12. The mounting system of claim 11 wherein said retainer has a retainer length, said engaging member has a length, and said retainer length of said retainer is generally equal to said length of said engaging member.

13. The mounting system of claim 11 wherein said retainer comprises two or more hinge members, spaced apart from each other, for engaging said engaging member.

14. The mounting system of claim 11 wherein said engaging member comprises one or more interface members for engaging said retainer, and said keeper comprises one or more interface members for engaging said latch.

15. The mounting system of claim 11 wherein said mounting bracket is symmetrical such that said engaging member and said keeper are generally uniform in size and shape, and such that said mounting bracket may be rotated 180 degrees to attach the removable device to said vehicle.

16. The mounting system of claim 11 wherein said latch further comprises a pawl pivotally connected to said removable device and engaging said rotor to hold said rotor in a closed position.

17. The mounting system of claim 16 wherein said rotor is spring loaded toward an open position.

18. The mounting system of claim 17 further comprising a release connected to said pawl wherein triggering of said release allows said pawl to rotate, thereby allowing said rotor to rotate into said open position.

19. The mounting system of claim 1 further comprising:
a pawl pivotally connected to said removable device, the pawl engaging a notch in the rotor to hold said rotor in a closed position in a closed state;
a pawl spring biasing the pawl against the notch in the rotor in the closed state;
a rotor spring associated with the rotor; and
a release lever attached to the pawl, the release lever requiring application of a force by a user to overcome the biasing force of a rotor spring and a pawl spring to release the pawl and disconnect the removable device from the mounting bracket for an open state.

20. The mounting system of claim 11 further comprising:
a pawl pivotally connected to said removable device, the pawl engaging a notch in the rotor to hold said rotor in a closed position in a closed state;
a pawl spring biasing the pawl against the notch in the rotor in the closed state;
a rotor spring associated with the rotor; and
a release lever attached to the pawl, the release lever requiring application of a force by a user to overcome the biasing force of a rotor spring and a pawl spring to release the pawl and disconnect the removable device from the mounting bracket for an open state.

21. The mounting system of claim 1 further comprising mounting holes in the flange for attaching the mounting bracket to the vehicle.

22. The mounting system of claim 11 further comprising mounting holes in the flange for attaching the mounting bracket to the vehicle.

23. The mounting system of claim 1 further comprising:
a first side and a second side, among the sides that extend from the flange, wherein the first side and the second side terminate in a cylindrical edge.

24. The mounting system of claim 11 further comprising:
a first side and a second side, among the sides that extend from the flange, wherein the first side and the second side terminate in a cylindrical edge.

* * * * *